United States Patent [19]

Elsenbaumer

[11] Patent Number: 5,006,278

[45] Date of Patent: Apr. 9, 1991

[54] SOLUTION PROCESSIBLE FORMS OF ELECTRICALLY CONDUCTIVE POLYANILINE AND THE METHOD OF MANUFACTURE OF ELECTROCONDUCTIVE ARTICLES THEREFROM

[75] Inventor: Ronald L. Elsenbaumer, Morristown, N.J.

[73] Assignee: Allied-Signal, Morris Township, Morris County, N.J.

[21] Appl. No.: 471,463

[22] Filed: Jan. 29, 1990

Related U.S. Application Data

[62] Division of Ser. No. 2,528, Jan. 12, 1987, Pat. No. 4,983,322.

[51] Int. Cl.$^5$ .............................................. H01B 1/00
[52] U.S. Cl. ................................. 427/385.5; 252/500; 252/518; 252/519; 264/331.19
[58] Field of Search ...................... 252/500, 518, 519; 528/422; 524/500; 427/384, 385.5; 264/331.11, 331.19

[56] References Cited

U.S. PATENT DOCUMENTS

| | | | |
|---|---|---|---|
| 4,798,685 | 1/1989 | Yaniger | 252/500 |
| 4,806,271 | 2/1989 | Yaniger et al. | 252/500 |
| 4,822,638 | 4/1989 | Yaniger | 252/500 |
| 4,851,487 | 7/1989 | Yaniger | 252/500 |
| 4,855,361 | 8/1989 | Yaniger et al. | 525/436 |

*Primary Examiner*—Josephine Barr
*Attorney, Agent, or Firm*—R. C. Stewart, II; G. H. Fuchs; E. D. Buff

[57] ABSTRACT

This invention relates to solutions and plasticized compositions of electrically conductive substituted and unsubstituted polyanilines and to methods of forming such solutions or compositions and use of same to form conductive articles.

40 Claims, No Drawings

SOLUTION PROCESSIBLE FORMS OF ELECTRICALLY CONDUCTIVE POLYANILINE AND THE METHOD OF MANUFACTURE OF ELECTROCONDUCTIVE ARTICLES THEREFROM

This application is a division of application Ser. No. 002,528, filed Jan. 12, 1987 now U.S. Pat. No. 4,983,322.

BACKGROUND OF THE INVENTION

1. Field of the Invention

This invention relates to solutions of electrically conductive substituted or unsubstituted polyanilines and to methods of forming such solutions. Another aspect of this invention relates to a method of using such solutions to form conducting polymer articles, including films, and methods of using such solutions as electrically conducting solutions.

2. Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, Tetsuhiko, et al., *J. Electroanal. Chem.*, "Electrochemical Reactions Concerned With Electrochromism of Polyaniline Film-Coated Electrodes", 177 (1984) 281–291, describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Donomedoff, F. Kautier - Cristojini, R. ReSur-vall, M. Jozefowicz, L-T. Yu, and R. Buvet, J. Chim. Phys. Physicohim. Brol 68, 1055 (1971); "Continuous Current Conductivity of Macromolecular Materials", L-T. Yu, M. Jozefowicz, and R. Buvet, Chim. Macromol. 1, 469 (1970); "Polyaniline Based Filmogenic Organic Conductive Polymers", D. LaBarre and M. Jozefowicz, C. R. Read. Sci., Ser. C, 269, 964 (1969); "Recently Discovered Properties of Semiconducting Polymers", M. Jozefowicz, L-T. Yu, J. Perichon, and R. Buvet, J. Polym. Sci., Part C, 22, 1187 (1967); "Electrochemical Properties of Polyaniline Sulfates", F. Cristojini, R. De Surville, and M. Jozefowicz, Cr. Read. Sci., Ser. C, 268, 1346 (1979); "Electrochemical Cells Using Protolytic Organic Semiconductors", R. De Surville, M. Jozefowicz, L-T. Yu, J. Perichon, R. Buvet, Electrochem. Ditn. 13, 1451 (1968); "Oligomers and Polymers Produced by Oxidation of Aromatic Amines", R. De Surville, M. Jozefowicz, and R. Buvet, Ann. Chem. (Paris), 2 5 (1967); "Experimental Study of the Direct Current Conductivity of Macromolecular Compounds" L-T. Yu, M. Borredon, M. Jozefowicz, G. Belorgey, and R. Buvet, J. Polym. Sci. Polym. Symp., 16, 2931 (1967); "Conductivity and Chemical Properties of Oligomeric Polyaniline", M. Jozefowicz, L-T. Yu, G. Belorgey, and R. Buvet, J. Polym. Sci., Polym. Symp., 16, 2934 (1967); "Products of the Catalytic Oxidation of Aromatic Amines", R. De Surville, M. Jozefowicz, and R. Buvet, Amm. Chem. (Paris), 2, 149 (1967); "Conductivity and Chemical Composition of Macromolecular Semiconductors", Rev. Gen. Electr., 75 1014 (1966); "Relation Between the Chemical and Electrochemical Properties of Macromolecular Semiconductors", M. Jozefowicz and L-T. Yu, Rev. Gen. Electr., 75 1008 (1966); "Preparation, Chemical Properties, and Electrical Conductivity of Poly-N-Alkyl Anilines in the Solid State", D. Muller and M. Jozefowicz, Bull. Soc. Chem. Fr. 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

In the general field of conducting polyaniline, it was heretofore believed impossible to dope a high molecular weight polyaniline to the extent that it becomes a semiconductor or conductor and thereafter dissolve or plasticize the doped, conductive form of polyaniline in common organic solvents. As used herein, a "plasticized composition" is a solid polymer which includes solvent molecules to an extent sufficient to render the article flexible (softened) and not brittle. The liquid additive is known as a plasticizer. The nature of plasticized materials is described in more detail in "Contemporary Polymer Chemistry," Harry R. Allcock and Frederick W. Lampe, Prentice-Hall, Inc. Englewood Cliffs, N.J., p. 13 (1981). In the absence of solutions or plasticized forms, the ability to form certain articles out of conductive polyaniline, and especially homogeneous conducting or semi-conducting polyaniline films, is restricted. Thus, a need exists for techniques to facilitate the fabrication of shaped conductive polyaniline articles, especially articles such as films, fibers and coatings.

SUMMARY OF THE INVENTION

One aspect of the present invention relates to a solution and plasticized polymeric compositions comprising polyaniline of film forming molecular weight, a solvent selected from the group consisting of polar organic solvents and a dopant solute selected from the group consisting of oxidizing dopants.

Another aspect of the present invention relates to a method of forming the solution of this invention by dissolving said polyaniline, said oxidizing dopant, either separately or in combination as a doped polyaniline, in said solvent.

Yet another aspect of this invention relates to a method of forming a conductive article from the solution or plasticized composition of this invention which compromises the steps of:

a. forming a solution or plasticized composition comprising polyaniline, a solvent selected from the group consisting of polar organic solvents and a dopant solute selected from the group consisting of oxidizing dopants; and b. removing all or a portion of said solvent from said solution or plasticized composition.

Still another aspect of this invention relates to conductive polyaniline articles prepared in accordance with the method of this invention.

Use of the solution or plasticized composition of this invention in the method of this invention provides conductive polyaniline articles of all shapes, as for example, films, which are stable, free standing and flexible.

DETAILED DESCRIPTION OF THE INVENTION

The solution or plasticized composition of this invention comprises three essential ingredients. One essential ingredient is a substituted or unsubstituted polyaniline. In general, polyanilines for use in the invention are polymers and copolymers of film forming molecular weight derived from the polymerization of unsubstituted and substituted anilines of the Formula I:

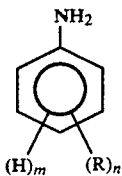

Formula I wherein
n is an integer from 0 to 4;
m is an integer from 0 to 5 with the proviso that the sum of n and m is equal to 5; and
R is the same or different at each occurrence and is selected from the group consisting of alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halo, nitro, cyano or epoxy moieties; or carboxylic acid, halogen, nitro, cyano, or sulfonic acid moieties; or any two R groups together may form an alkylene or alkenylene chain completing a 3, 4, 5, 6 or 7 membered aromatic or alicyclic ring, which ring may optionally include one or more divalent nitrogen, sulfur or oxygen atoms.

Illustrative of the polyanilines useful in the practice of this invention are those of the Formulas II to V:

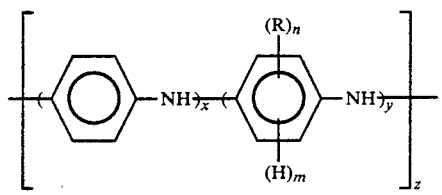

or

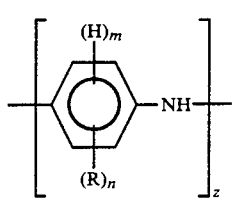

or

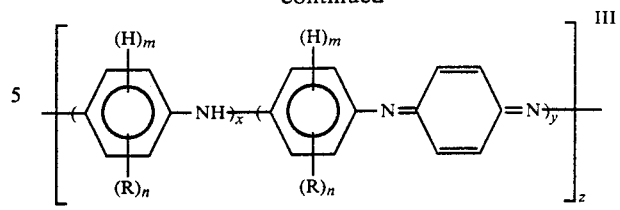

or

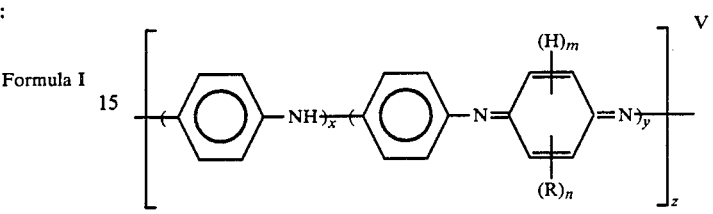

wherein:
n, m and R are as described above;
y is an integer equal to or greater than 0;
x is an integer equal to or greater than 1, with the proviso that the sum of x and y is greater than 8;
z is an integer to or greater than 1.

The following listing of substituted and unsubstituted anilines are illustrative of those which can be used to prepare polymers and copolymers useful in the practice of this invention.

| | |
|---|---|
| Aniline | 2,5-Dimethylaniline |
| o-Toluidine | 2,3-Dimethylaniline |
| m-Toluidine | 2,5-Dibutylaniline |
| o-Ethylaniline | 2,5-Dimethoxyaniline |
| m-ethylaniline | Tetrahydro naphthyl amine |
| 0-Ethoxyaniline | o-Cyanoaniline |
| m-Butylaniline | 2-Thiomethylaniline |
| m-Hexylaniline | 2,5 Dichloroaniline |
| m-Octylaniline | 3-(n-Butanesulfonic acid) |
| 4-Bromoaniline | aniline |
| 2-Bromoaniline | |
| 3-Bromoaniline | 2,4-Dimethoxyaniline |
| 3-Acetamidoaniline | 4-Mercaptoaniline |
| 4-Acetamidoaniline | 4-Methylthioaniline |
| 5-Chloro-2-methoxy-aniline | 3-phenoxyaniline |
| 5-Chloro-2-ethoxy-aniline | 4-phenoxyaniline |

Illustrative of useful R groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; alkylsulfinyl, alkylsulfonyl, alkylthio, arylsulfonyl, arylsulfonyl, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxymethylene, ethoxymethyl, butoxymethyl, propoxyethyl, pentoxybutyl and the like; aryloxyalkyl and aryloxyaryl such as phenoxyphenyl, phenoxymethylene the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitro-ethyl, trifluoromethyl, 3,4-epoxybutyl, cyanomethyl, 3-chloropropyl, 4-nitrophenyl, 3-cyanophenyl, and the like; sulfonic acid terminated alkyl and aryl groups and carboxylic acid terminated alkyl and aryl groups such as ethylsulfonic acid, propylsulfonic acid, butylsulfonic acid, phenylsulfonic acid, and the corresponding carboxylic acids.

Also illustrative of useful R groups are divalent moieties formed from any two R groups such as moieties of the formula:

wherein n is an integer from about 3 to about 7, as for example $-\!\!+\!CH_2\!\!+\!_4$, $-\!\!+\!CH_2\!\!+\!_3$ and $-\!\!+\!CH_2\!\!+\!_5$, or such moieties which optionally include heteroatoms of oxygen and sulfur such as $-CH_2SCH_2-$ and $-CH_2-O-CH_2 13$. Exemplary of useful R groups are divalent alkenylene chains including 1 to about 3 conjugated double bond unsaturation such as divalent 1,3-butadiene and like moieties.

Preferred for use in the practice of this invention are polyanilines of the above Formulas II to V in which:

n is an integer from 0 to about 2;

m is an integer from 3 to 5, with the proviso that the sum of n and m is equal to 5;

R is alkyl or alkoxy having from 1 to about 12 carbon atoms, cyano, halogen, or alkyl substituted with carboxylic acid or sulfonic acid substituents;

x is an integer equal to or greater than 1;

y is an integer equal to or greater than 0, with the proviso that the sum of x and y is greater than about 4; and z is an integer equal to or greater than about 5.

Particularly preferred for use in the practice of this invention are polyanilines of the above Formulas II to V in which:

n is an integer from 0 to 2;

m is an integer from 3 to 5, with the proviso that the sum of n and m is equal to 5;

R is alkyl or alkoxy having from 1 to about 4 carbon atoms, or alkyl substituted with carboxylic acid or sulfonic acid substituents x is an integer equal to or greater than 1;

y is an integer equal to or greater than 0, with the proviso that the sum of x and y is greater than about 6; and z is an integer equal to or greater than about 10.

Amongst the particularly preferred embodiments, most preferred for use in the practice of this invention are polyanilines of the above Formulas II to V in which:

n is an integer from 0 to 1;

m is an integer from 4 to 5, with the proviso that the sum of n and m is equal to 5;

R is alkyl or alkoxy from 1 to about 4 carbon atoms;

x is an integer equal to or greater than 2;

y is an integer equal to or greater than 1, with the proviso that the sum of x and y is greater than about 8; and z is an integer equal to or greater than about 15. In the most preferred embodiments of this invention, the polyaniline is derived from unsubstituted aniline.

In general, the polyanilines particularly useful in the practice of this invention are those which are of "film forming molecular weight". As used herein, "film forming molecular weight" generally means number average molecular weights which exceed about 15,000. Solutions of such soluble polymers generally can be cast to form thin, freestanding films which are coherent and retain their shape, and preferably are not brittle when bent. In general, an advantage of this invention is that substituted and unsubstituted polyanilines may be dissolved in organic solvents with or without prior salt formation with an acid and such polyanilines have more than 8 monomer repeat units as for example those polyanilines described in U.S. Pat. Nos. 3,963,498 and 4,025,463. Because of the higher molecular weight, these substituted and unsubstituted polyanilines can be coated onto substrates without the need for binders, i.e. polymer compositions which bind and improve the stability of the polyanilines which is not generally true of the low molecular weight oligomeric polyanilines described in U.S. Pat. Nos. 3,963,498 and 4,025,463. The molecular weight of the substituted or unsubstituted polyaniline at which the polymer will be film forming may vary widely, depending on a number of factors including the number of repeat units, and the number of substituents and the substituent pattern. In general, substituted and unsubstituted polyanilines will be of film forming molecular weight where the number of monomer repeat units is at least about 150. In the preferred embodiments of the invention, the number of repeat units is at least about 75, and in the particularly preferred embodiments, the number of repeat units is at least about 200. Amongst the particularly preferred embodiments, most preferred are those embodiments in which the number of repeat units is at least about 250.

Any form of substituted and unsubstituted polyaniline can be conveniently used in the practice of this invention. Illustrative of useful forms are those described in Green, A. G. and Woodhead, A. E., "Aniline-black and Allied Compounds, Part I", J. Chem. Soc., vol. 101, pp. 1117 (1912) and Kobayashi, et al., "Electrochemical Reactions . . . of Polyaniline Film-Coated Electrodes", J. Electroanal. Chem., Vol 177, pp. 281–91 (1984), which is hereby incorporated by reference. for example, unsubstituted polyaniline, useful forms include leucoemeraldine, protoemeraldine, emeraldine, nigraniline and tolu-protoemeraldine forms.

Useful polyanilines can be prepared through use of chemical and electrochemical synthetic procedures. For example, one form of polyaniline having at least about 160 repeat units can be prepared by treating aniline with ammonium persulfate $(NH_4)_2S_2O_8$ in excess 1M HCl. This powdered form of polyaniline is blue green in color. After methanol washing and air drying this material exhibited a conductivity of 10 S/cm. This conductive form of polyaniline can be treated with ammonium hydroxide in ethanol to form a non-conductive form of polyaniline which is purple in color and which has a conductivity of less than $10^{-8}$ S/cm. Other chemical procedures for preparation of various chemical forms of polyaniline are described in detail in Green et al. described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The second essential ingredient of the solution or plasticized composition of this invention is an "oxidizing dopant". As used herein an "oxidizing dopant" is a dopant which forms a charge transfer complex with polyaniline, which complex has a conductivity equal to or greater than about $10^{-3}$ ohm$^{-1}$ cm$^{-1}$. Oxidizing dopants are well known in the conductive polymer art, and any of such known oxidizing dopants can be used. Dopants for use in the practice of this invention can vary widely and can be such materials which are known in the art for use in doping conjugated backbone polymers to form conductive or semi-conductive polymers, as for example, those described in detail in U.S. Pat. Nos. 4,442,187 and 4,321,114 which are hereby incorporated by reference. Illustrative of useful dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_3$), $HClO_4$, $HNO_3$, $H_2SO_4$, p-toluenesulfonic acid (TsOH), benzoylperoxide, $CF_3SO_3H$, $SO_3$, $Br_2$, $(FSO_3)_2$, $ZnCl_2$, $FSO_3H$, Fe(III) salts (such as $Fe(BF_4)_3$, $FeBr_3$, $Fe(CH_3SO_3)_3$, $Fe(ClO_4)_3$, $FeCl_3$, $Fe(OTS)_3$, and $Fe(CF_3SO_3)_3$ which give rise to doped polymers containing dopant solutes such as $NO_3^-$, $CH_3SO_3^-$, $AlCl_4^-$, $BF_4^-$, $ZnCl_4^-$, $PCl_4^-$, $PF_6^-$, $AsF_6^-$, $SbF_6^-$, $CF_3SO_3^-$, $ClO_4^-$, $OTs^-$, $SO_3^-$, $C_6H_5CO_2^-$, $CH_3SO_3^-$, $FSO_3^-$, and $FeCl_4^-$. Other useful electron acceptor dopants include electrolyte salts such as $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$. $AgOTs$, and the like. Preferred for use in the practice of this invention are oxidizing dopants selected from the group consisting of $MoOCl_4$, $MoCl_5$, $PCl_5$, $POCl_3$, and Fe (III) salts such as $Fe(ClO_4)_3$, $FeCl_3$, $FeBr_3$, and $Fe(CF_3SO_3)_3$, and particularly preferred for use in the practice of this invention are dopants selected from the group consisting of $MoOCl_4$, $MoCl_5$, $PCl_5$, $POCl_3$, $FeBr_3$ and $FeCl_3$. Amongst these particularly preferred embodiments, most preferred are those embodiments in which the oxidizing dopant is $FeCl_3$.

The amount of dopant employed is not critical and can vary depending on the degree of conductivity and solubility required and whether a solution or plasticized composition is desired. In general, sufficient dopant is added to the polymer (in solution or in solid form of a plasticized composition) to form a doped polymer (either in the form of a plasticized composition or in solution) which is a semi-conductor or a conductor and which is soluble in solvents described below, or which is plasticized by such solvents. Usually the amount of dopant employed is at least sufficient to give a doped polymer (either in solution or in solid form) having a conductivity of at least about $10^{-6}$ ohm$^{-1}$cm$^{-1}$. The upper level of conductivity is not critical and will usually depend on the type of aniline polymer employed. In general, the highest level of conductivity obtained is provided without unduly adversely affecting the environmental stability of the polymer. In the preferred embodiments of the invention the amount of dopant employed is sufficient to provide a conductivity of at least about $10^{-4}$ohm$^{-1}$cm$^{-1}$, and in the particularly preferred embodiments is sufficient to provide a conductivity of at least about $10^{-2}$ohm$^{-1}$cm$^{-1}$. Amongst these particularly preferred embodiments, most preferred are those embodiments in which unsubstituted polyaniline is employed and in which sufficient dopant is employed to provide a conductivity of at least about $10^{-1}$ohm$^{-1}$cm$^{-1}$, with amounts sufficient to provide a conductivity of from about $10^{-1}$ohm$^{-1}$cm$^{-1}$ to $10^{-1}$ohm$^1$cm$^{-1}$ usually being the amounts of choice.

It has been discovered that the amount of doping determines whether a plasticized composition or a solution is formed. In general, the higher the degree of doping, the greater the solvency of the doped polymer in the solvent. Conversely, the lower the degree of doping, the less the solvency of the doped polymer in the solvent, but the polymer is still plasticizable. For example, as shown in Example 4, in the case of the most preferred unsubstituted polyaniline where the level of doping is about 1.0 or more equivalents of dopant per aniline repeat unit, soluble conductive polyaniline is provided. However, where the level of doping is less than about 1 equivalents of dopant per aniline repeat units, plasticizable conductive polymers are formed. As noted above, sufficient doping occurs to form either the soluble conductive polymer or plasticized conductive polymer. In a preferred embodiment of this invention, the level of doping is such that solutions of conductive polymer are obtained.

The third component of the solution of this invention is a polar organic solvent. As used herein the polar organic solvent is a solvent which has a dielectric constants of equal to or greater than about 25 and dipole moment of equal to or greater than about 3.25. Preferred solvents are those solvents with dielectric constants equal to or greater than about 30 and dipole moments greater than about 3.25. Especially preferred solvents are those solvents with dielectric constants equal to or greater than about 35 and dipole moments greater than about 3.4. Illustrative of useful solvents are alkyl alkanesulfonates such as methyl methanesulfonate, ethyl methanesulfonate, butyl methanesulfonate, propyl ethanesulfonate; nitriles such as acetonitrile, propionitrile, butyronitrile, benzonitrile and the like; aromatic solvents such as nitrobenzene and the like; carbonates such as propylene carbonate, dimethyl carbonate, ethylene carbonate and the like; nitroalkanes, such as nitromethane, nitroethane, nitropropane, and the like; amides such as dimethyl formamide, dimethyl thioformamide, N,N-dimethyl acetamide, N-methylpyrrolidinone and the like; organophosphorus compounds such as hexamethyl phosphoroamide, diethylphosphate, triethylphosphites, trimethylphosphate and the like; and organosulfur compounds such as sulfolane, methyl sulfolane, dimethyl sulfone, dimethyl sulfoxide, glycol sulfite, tetraethylsulfamide and the like. Mixtures of such organic solvents can also be used as for example mixtures of sulfolane and acetonitrile.

Solvents selected for use in any particular situation will depend primarily on the polarity of various R substituents, and/or the degree of doping. In general, more polar substituents and/or higher doping levels of the polymer, will require solvents with higher dielectric constants and dipole moments. Conversely, less polar substituents and/or lower doping levels of the polymer, will require solvents with lower dielectric constants and dipole moments.

Preferred solvents are benzonitrile, propylene carbonate, nitrated alkane and aryl compounds such as nitromethane, nitroethane, nitropropane, and nitrobenzene, dimethyl formamide, and dimethyl sulfoxide, and particularly preferred solvents are nitrated alkane and aryl compounds such as nitromethane, nitroethane, nitropropane and nitrobenzene. Amongst these particularly preferred embodiments, most preferred are those embodiments in which the solvents are nitrated alkane compounds such as nitromethane.

The proportion of polymer and solvent in the solution of this invention containing the doped polyaniline homopolymer or copolymer and the organic solvent are not critical and can vary widely. However, the following guidelines are believed important for achieving solutions particularly useful in the present invention. In general, the amount of solvent as a proportion of the amount of solution is not believed to be critical, since any amount as a liquid will form at least a viscous gel with the doped polymers. These viscous embodiments of the invention are particularly useful for silkscreening conductive circuitry and for applying thick film coatings on substrates. For other applications, it may be preferred, however, to use sufficient liquid solvent to lower the viscosity of the gel or solution to a point where it flows at least sufficiently to conform to a container shape or mold in a reasonably short period of time, e.g., in 30 minutes or less. Preferably, the solvent is present in sufficient amounts to lower the viscosity of the solution to less than about 10,000 centipoise, and more preferably from about 1 to about 1000 centipoise.

In addition to the essential homopolymer or copolymer, dopant and solvent, the solutions of this invention can include other optional ingredients which either dissolve or do not dissolve in the solution. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include other conventional polymers such as polycarbonate, polyacrylonitrile, polyvinyl chloride, polyvinylidine chloride, polyvinyl alcohol, polyethylene oxide, polystyrene, nylon, celulose acetate butyrate, polypropylene, polyethylene, celulose acetate, polyphenylene oxides and the like. In the case of nonsoluble fourth components, materials may be present which either fill or form a substrate for the conductive polymer cast from the solution. These fourth components include other conductive polymers, other polymers such as polyacetylene which may become conductive upon doping, graphite, metal conductors, reinforcing fibers and inert fillers (such as clays and glass).

The method of forming the solutions of this invention is not critical and can vary widely. For example, one preferred method of forming the present solution containing the doped homopolymer or copolymer is to react, simultaneously, the undoped polymer, the dopant and the solvent as a liquid. Thus, for example, by introducing polyaniline as a solid powder, nitrobenzene as a liquid and ferric chloride as a solid into a mixing vessel, a solution of the doped polymer is quickly formed, from which conductive polymer can be cast. The conditions of such mixing are not critical, provided that sufficient ferric chloride is used to dope the desired quantity of polymer and sufficient solvent is employed to reduce the viscosity of the solution to manageable levels. An alternate technique of preparing the solution of this invention containing the doped polymer is to mix first the polymer and the solvent, thereafter add the dopant to the solution or two phase system. Thus, for example, if polyaniline powder is admixed with nitromethane solvent, the powder will remain on or suspended in the solvent for extended periods under normal conditions. The addition of a dopant to this suspension, such as $FeBr_3$, causes the powder to be doped and, almost instantaneously thereafter, causes the doped polymer to go into solution.

Various methods are contemplated for using the solution of the present invention. The solvent can be removed from the solution through use of any conventional solvent removal method but is removed preferably by evaporation. Alternatively, the solvent and dopant precursor can be removed by extraction with an extractant in which the solvent and dopant precursor are substantially more soluble than the doped polymer As will be appreciated by those skill in polymer processing, the ability to form polymer articles by removing a solvent from a solution enables one to prepare articles of a wide variety of shapes and sizes. Thus, for example, by removing volatiles from the present solution spread on a surface, films of any desired thickness can be prepared Extremely thin films can be prepared which are substantially transparent. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article, but such shrinkage is conventionally accounted for in molding polymers from solution. It is also contemplated that, once a solution is formed, a partial or substantial removal of solvent will occur prior to placing the solution on a surface or in a mold, with the final venting of solvent occurring on the surface or in the mold. It is contemplated that, if fourth or additional soluble components are introduced into the solution, they will, unless also volatile, be present in the shaped article formed. If the fourth component is a non-volatile liquid, then the removal of volatile components may leave a new liquid or plasticized form of doped conducting polymer or undoped neutral polymer If the additional components are volatile, then foamed or expanded cellular forms of the polymer may be formed.

In the event that fourth or additional non-soluble components are present (or suspended) in the solution, the doped polymer will form around, or be filled with, the insoluble material. If, for example, the additional components are glass fibers, the relative amounts of fibers and doped polymer remaining will cause either the polymer to be fiber-filled, the fibers to be polymer coated or impregnated, or some intermediate composite of fibers and doped polymer to be formed. In the case of systems wherein the amount of non-soluble component greatly exceeds the doped polymer remaining, individual particles or shapes of non-soluble components coated or impregnated with doped polymer will be formed. Examples of articles formed from non-soluble components and the present polymer solutions include conductive polymer coated-housings for sensitive electronic equipment (microprocessors), infrared and microwave absorbing shields, flexible electrical conducting connectors, conductive bearings, brushes and semiconducting photoconductor junctions, antistatic materials for packaging electronic components, carpet fibers, waxes for floors in computer rooms and an antistatic spray finisher for plastics, and thin, optically transparent antistatic finishes for CRT screens, aircraft, auto windows and the like.

It is also contemplated to use the present solutions as such as either liquid conductors or liquid semiconductors, much in the manner that liquid mercury is used in various devices. Examples of such devices include gravity switches, fluid level detecting devices or other electrical or electronic switches. Such use is based upon the conductivity of the doped solution, which the case of polyaniline doped with $FeCl_3$ in nitromethane can represent a relatively high conductivity (from about $10^{-3} ohm^{-1} cm^{-1}$ to about $10^1 ohm^{-1} cm^{-1}$) which appears to be predominantly of an electronic rather than ionic nature.

A fourth application for the present polymer solutions is in the doping of other materials, and especially other conjugated backbone polymers which could also be doped by the electron-acceptor dopant alone. Such doping may occur as a part of the process of casting the polymer solution onto the second polymer article, but may also be accomplished without, necessarily, casting the conductive polymer from the solution.

The following specific examples are present to illustrate the invention and are not to be construed as limitations thereon.

EXAMPLE 1

Polyaniline powder was prepared by the method of A. G. Green et al. using aniline and ammonium persulfate in 1M hydrochloric acid. The resulting powdered polymer was thoroughly washed with water and alcohol to remove the soluble portion (low molecular weight oligomers) according to Trevoy, U.S. Pat. No. 3,963,498. The remaining conductive powders at this point were completely insoluble in all common solvents such as alcohols, esters, hydrocarbons, and the like. This conductive form was made nonconductive by treatment with aqueous base The resulting polymer was also insoluble in all common solvents, and of high molecular weight.

Into 40 ml of a saturated ferric chloride solution in nitromethane was placed 1.0 g of the nonconductive form of polyaniline and the mixture was stirred for 2 hrs. Filtration through a medium porosity fritted funnel revealed that most of the solids dissolved. The solvent was removed from the filtered solution at 40° C. under vacuum. A film of doped polyaniline remained which had a four point probe conductivity of 0.25 S/cm Similar results were obtained by repeating the above experiment with acetonitrile in place of nitromethane.

EXAMPLE 2

The solution of Example 1 was concentrated until it became viscous. An engraved rubber stamp was dipped into the viscous solution to coat the raised portions of the stamp with the conductive solution The coated stamp was pressed onto a piece of paper thereby leaving a printed image of the stamp on the paper. By applying an ohm meter across the image it was determined that the image was conductive; two probe resistivities of 100 Kohm were measured. This demonstrates the feasibility of using this soluble form of conductive polyaniline as a conductive ink.

EXAMPLE 3

The hydrochloride (acid salt) form of polyaniline (1 g) as prepared in Example 1 was suspended in nitromethane (20 ml) at room temperature. After 1 hr no solubilization was noted. To the suspension was added 1 equivalent of ferric chloride was added and dissolution of the solids was noted. After stirring for several hours, most of the polymer dissolved to give a deep green solution. Filtration of the solution followed by evaporation of the solvent gave a freestanding polymer film with a four-point conductivity of 0.1 S/cm. The cast film was very flexible; bending to 180 degrees did not cause the film to break.

Similar results were obtained when aluminum chloride was used in place of ferric chloride.

This example demonstrates that in addition to the neutral form of polyaniline, the conductive form can be solublized by treatment with the proper dopant.

EXAMPLE 4

The nonconductive form of polyaniline as prepared in Example 1 was treated with less than 1 eq. of ferric chloride in nitromethane. After stirring at room temperature for several hours, the solution was filtered. The solution fraction was condensed and the solids were dried. Elemental analysis showed that the ratio of dopant ($FeCl_4^-$) to PhN repeat unit was 1.3. After treatment of 104.3 mg of this solid with aqueous base and washing, 35.1 mg remained. Assuming the weight loss is due to loss of dopant, this corresponds to a ratio of $FeCl_4^-$ to PhN of 1.1, in close agreement with the elemental analysis.

The insoluble fraction was also analysed, and a ratio of $FeCl_4^-$ to PhN of 0.65 was obtained. Weight loss on treatment with base confirms this value.

Although this latter fraction was not completely soluble, it was highly plasticized by the solvent. The viscous gel was coated onto a glass substrate and dried. The resulting film was freestanding and had a four-point probe conductivity of 0.5 S/cm. This demonstrates the usefulness of this form as a processible conductive polymer.

Thus, in order to obtain a soluble conductive polyaniline, 1.0 or more equivalents of dopant per aniline repeat unit are necessary. Less than this amount results in a doped, conductive, plasticizable form of the polymer which is capable of being conveniently processed into shaped, conductive articles.

This example was performed to determine the required ratio of ferric chloride to aniline repeat unit needed to obtain the solution form and plasticizable forms of polyaniline.

EXAMPLE 5

To a solution of conductive polyaniline as prepared in Example 1 was added a solution of cellulose acetate butyrate in nitromethane. A homogeneous deep green-blue solution resulted. Evaporation of the solvent afforded freestanding flexible composite films with good mechanicals. The conductivity of the dried film was 0.001 S/cm, which is useful for antistatic applications.

What is claimed is:

1. A method of forming a conductive article which comprises the steps of:
    (a) forming a conductive material selected from the group consisting of solutions and plasticized compositions comprising one or more solvents selected from the group consisting of solvents having a dielectric constant equal to or greater than about 25 and a dipole moment equal to or greater than about 3.25; one or more dopant solutes selected from the group consisting of oxidizing dopants which form a charge transfer complex with the polyaniline having a conductivity equal to or greater than about $10^{-3}$ohm$^{-1}$cm$^{-1}$; and a substituted or unsubstituted polyaniline having a molecular weight of greater than about 15,000 prepared by polymerizing an aniline of the Formula I:

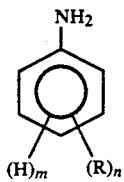

wherein:
n is an integer from 0 to 4;
m is an integer from 0 to 5 with proviso that the sum of n and m is 5;
R is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alksulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano or epoxy moieties; or and two R substituents taken together are an alkylene or alkenylene group completing a 3, 4, 5, 6 or 7 membered aromatic or alicyclic carbon ring, which ring may include one or more divalent heteroatoms of nitrogen, sulfur, sulfinyl, sulfonyl or oxygen; and
(b) removing the solvent from said material to form said article.

2. A method according to claim 1 wherein said polyaniline is of the Formula II to V:

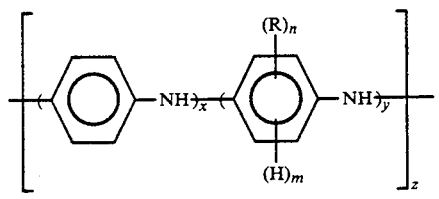

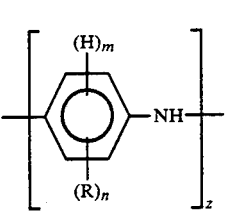

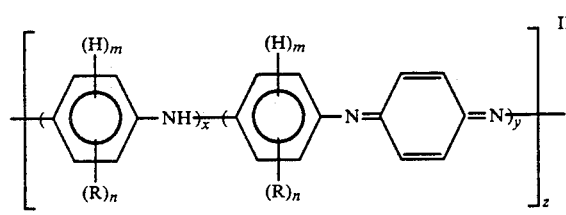

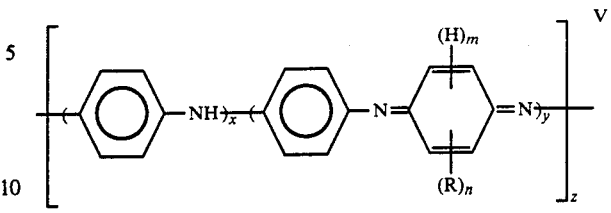

wherein:
x is an integer equal to or greater than 1;
y is an integer equal to or greater than 0, with the proviso that the sum of x and y is greater than 8;
z is greater than about 1;
n is an integer from 0 to 5 with the proviso that the sum of n and m is 5;
R is the same or different at each occurrence and is alkyl, alkenyl, alkyoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano or epoxy moieties; or any two R substituents taken together are an alkylene or alkenylene group completing a 3, 4, 5, 6 or 7 membered aromatic or alicyclic carbon ring, which ring may optionally include one or more divalent heteroatoms of nitrogen, sulfur, sulfinyl, sulfonyl or oxygen.

3. A method according to claim 1 wherein m is equal to 5 and n is 0.

4. A method according to claim 1 wherein said polyaniline is derived from substituted anilines.

5. A method according to claim 2 wherein R is the same or different at each occurrence and is alkyl or alkoxy having from 1 to about 12 carbon atoms, cyano, halogen or alkyl having from 1 to about 12 carbon atoms substituted with carboxylic acid or sulfonic acid substituents.

6. A material according to claim 5 wherein R is the same or different at each occurrence and is alkyl or alkoxy having from 1 to about 4 carbon atoms, or substituted alkyl having from 1 to about 4 carbon atoms wherein permissible substituents are alkyl, carboxylic acid and sulfonic acid substituents.

7. A method according to claim 6 wherein R is the same or different at each occurrence and is alkyl having from 1 to about 4 carbon atoms.

8. A method according to claim 5 wherein n is 1 to 4.
9. A method according to claim 8 wherein n is 1 to 3.
10. A method according to claim 9 wherein n is 1.
11. A method according to claim 1 wherein said dopant is selected from the group consisting of AsF$_5$, MoOCl$_4$, MoCl$_5$, PCl$_5$, POCl$_3$, PCl$_3$, AlCl$_3$, NOBF$_4$, NOPF$_6$, NOSbF$_6$, NOAsF$_6$, NOCH$_3$CO$_2$, NO$_2$BF$_4$, NO$_2$PF$_6$, NO$_2$AsF$_6$, NO$_2$SbF$_6$, NO$_2$CF$_3$SO$_3$, HClO$_4$, HNO$_3$, H$_2$SO$_4$, p-toluenesulfonic acid, benzoyl peroxide, CF$_3$SO$_3$H, SO$_3$, Br$_2$, (FSO$_3$)$_2$, ZnCl$_2$, FSO$_3$H, Fe(BF$_4$)$_3$, FeBr$_3$, Fe(CH$_3$SO$_3$)$_3$, Fe(ClO$_4$)$_3$, FeCl$_3$, Fe(OTs)$_3$, Fe(CF$_3$SO$_3$)$_3$, LiClO$_4$, LiBF$_4$, LiAsF$_6$, NaPF$_6$, Bu$_4$NClO$_4$, Bu$_4$NOTs, Bu$_4$NCF$_3$SO$_3$, LiCF$_3$SO$_3$ and AgOTs.

12. A method according to claim 11 wherein said dopant is selected from the group consisting of $MoOCl_4$, $MoCl_5$, $POCl_3$, $PCl_5$, $AlCl_3$, $FeCl_3$, $FeBr_3$, $Fe(OTs)_3$, $Fe(CH_3SO_3)_3$, $Fe(CF_3SO_3)_3$, $ZnCl_2$, $Fe(ClO_4)_3$, and $Fe(BF_4)_3$.

13. A method according to claim 12 wherein said dopant is selected from the group consisting of $FeCl_3$, $FeBr_3$, $Fe(ClO_4)_3$, $AlCl_3$, $ZnCl_2$, $PCl_5$, $PCl_3$, $POCl_3$, and $MoCl_5$.

14. A method according to claim 13 wherein said dopant is selected from the group consisting of $FeCl_3$, $FeBr_3$, $ZnCl_2$, $PCl_3$ and $MoCl_5$.

15. A method according to claim 2 wherein z is equal to or greater than about 5.

16. A method according to claim 15 wherein z is equal to or greater than about 10.

17. A method according to claim 16 wherein z is equal to or greater than about 15.

18. A method according to claim 2 wherein x is from 0 to about 8 and y is from 0 to about 8, with the proviso that the sum of x and y is at least about 8.

19. A method according to claim 18 wherein x is from about 1 to about 8 and y is from 0 to about 7, with the proviso that the sum of x and y is at least about 8.

20. A method according to claim 19 wherein x is from about 2 to about 8 and y is from 0 to about 6 with the proviso that the sum of x and y is at least about 8.

21. A method according to claim 1 wherein said solvent is selected from the group consisting of organic solvents having a dielectric constant equal to or greater than about 25 and a dipole moment equal to or greater than about 3.25.

22. A method according to claim 21 wherein said dielectric constant is equal to or greater than about 30.

23. A method according to claim 22 wherein said dielectric constant is equal to or greater than about 35, and said dipole moment is equal to or greater than about 3.4.

24. A method according to claim 1 wherein said solvent is selected from the group consisting of nitroalkanes, nitroaromatics, acetonitrile, proprionitrile benzonitrile, dimethyl formamide, dimethyl sulfoxide and dimethyl acetamide.

25. A method according to claim 24 wherein said solvent is selected from the group consisting of nitroalkanes, nitroaromatics, dimethyl formamide, acetonitrile, proprionitrile and benzonitrile.

26. A method according to claim 1 wherein said solution contains sufficient dopant to provide a doped polyaniline having a conductivity of at least about $10^{-5}$ $ohm^{-1}cm^{-1}$.

27. A method according to claim 26 wherein said conductivity is at least about $10^{-4} ohm^{-1}cm^{-1}$.

28. A method according to claim 27 wherein said conductivity is at least about $10^{-3} ohm^{-1}cm^{-1}$.

29. A method according to claim 28 wherein said conductivity is at least about $10^{-2} ohm^{-1}cm^{-1}$.

30. A method according to claim 29 wherein said conductivity is at least about $10^{-1} ohm^{-1}cm^{-1}$.

31. A method according to claim 29 wherein said conductivity is at least about $10^{0} ohm^{-1}cm^{-1}$.

32. A method according to claim 31 wherein said conductivity is at least about $10^{1} ohm^{-1}cm^{-1}$.

33. A method according to claim 1 wherein said solvent is removed by evaporation.

34. A method according to claim 33 wherein said solution is subjected to evaporation on a substrate so as to form a film.

35. A method according to claim 33 wherein the solution is subjected to evaporation in a shaped mold so as to form a shaped article.

36. A method according to claim 33 wherein said solution is subjected to evaporation in the presence of a substrate insoluble in said solution so as to form a coating on the substrate.

37. A method according to claim 1 wherein said solvent is removed by extraction into a non-solvent for the conductive article.

38. A method according to claim 1 wherein said material is a solution.

39. Blends of conventional polymers with the plasticized forms of the materials in claim 1.

40. Method of claim 1 which further comprises mixing the material of claim 1 with a solution or melt of conventional polymers to provide a blend of one or more of said material and said conventional polymers, said blends having conductivities greater than about $10^{-6}$ S/cm.

* * * * *

UNITED STATES PATENT AND TRADEMARK OFFICE
CERTIFICATE OF CORRECTION

PATENT NO. : 5,006,278
DATED : April 9, 1991
INVENTOR(S) : R.L. Elsenbaumer

It is certified that error appears in the above-identified patent and that said Letters Patent is hereby corrected as shown below:

Col. 14, after line 17; insert "n is an integer from 0 to 4;".

Col. 14, line 18; "n" should read ---m---.

Col. 14, line 44; "material" should read ---method---.

Signed and Sealed this

First Day of June, 1993

Attest:

MICHAEL K. KIRK

Attesting Officer     Acting Commissioner of Patents and Trademarks